(12) United States Patent
Zhao et al.

(10) Patent No.: US 11,392,792 B2
(45) Date of Patent: Jul. 19, 2022

(54) METHOD AND APPARATUS FOR GENERATING VEHICLE DAMAGE INFORMATION

(71) Applicant: Baidu Online Network Technology (Beijing) Co., Ltd., Beijing (CN)

(72) Inventors: Shichao Zhao, Beijing (CN); Xiao Tan, Beijing (CN); Feng Zhou, Beijing (CN); Errui Ding, Beijing (CN); Hao Sun, Beijing (CN); Jiangfan Deng, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 263 days.

(21) Appl. No.: 16/564,696

(22) Filed: Sep. 9, 2019

(65) Prior Publication Data

US 2020/0110965 A1    Apr. 9, 2020

(30) Foreign Application Priority Data

Oct. 8, 2018  (CN) .......................... 201811169076.1

(51) Int. Cl.
*G06K 9/62* (2022.01)
*G06Q 10/10* (2012.01)
(Continued)

(52) U.S. Cl.
CPC ......... *G06K 9/6256* (2013.01); *G06N 3/0418* (2013.01); *G06Q 10/10* (2013.01); *G06V 10/25* (2022.01); *G06V 10/758* (2022.01)

(58) Field of Classification Search
CPC ..................... G06T 7/0002; G06T 7/11; G06T 2207/20081; G06T 2207/30248;
(Continued)

(56) References Cited

U.S. PATENT DOCUMENTS 4,899,292 A * 2/1990 Montagna .............. G06Q 40/08
9,886,771 B1 * 2/2018 Chen .................... G06F 3/04845
(Continued)

FOREIGN PATENT DOCUMENTS

CN         107403424 A  * 11/2017  ........... G06N 3/0454
CN         108154196 A     6/2018
(Continued)

OTHER PUBLICATIONS

Google Translation of CN107403424A Publication (Year: 2017).*
(Continued)

*Primary Examiner* — Aaron W Carter
(74) *Attorney, Agent, or Firm* — Nixon Peabody LLP (57) ABSTRACT

A method and an apparatus for generating vehicle damage information are provided. The method includes: acquiring a to-be-processed vehicle image; for a target detection model in at least one pre-trained target detection model: inputting the vehicle image to the target detection model to generate a suspected damage area detection result; and determining a location of a suspected damage area in the vehicle image based on the generated suspected damage area detection result. A mechanism for detecting a suspected damage area is provided based on the target detection model, improving the vehicle damage assessment efficiency.

13 Claims, 5 Drawing Sheets

(51) Int. Cl.
*G06N 3/04* (2006.01)
*G06V 10/25* (2022.01)
*G06V 10/75* (2022.01)

(58) Field of Classification Search
CPC ........ G06T 2207/20084; G06K 9/4604; G06K 9/6268; G06K 9/00671; G06K 9/036; G06Q 40/08; G06Q 10/20
See application file for complete search history.

(56) References Cited

U.S. PATENT DOCUMENTS

| | | | |
|---|---|---|---|
| 10,319,094 B1* | 6/2019 | Chen | G06F 3/0484 |
| 10,408,610 B1* | 9/2019 | Bernard | G01B 11/24 |
| 10,636,148 B1* | 4/2020 | Chen | G06T 19/20 |
| 10,657,647 B1* | 5/2020 | Chen | G06T 7/0046 |
| 10,657,707 B1* | 5/2020 | Leise | G06T 17/00 |
| 10,699,168 B1* | 6/2020 | Xu | G06N 20/00 |
| 10,706,321 B1* | 7/2020 | Chen | G06T 3/4007 |
| 10,740,891 B1* | 8/2020 | Chen | G06T 7/001 |
| 10,922,726 B1* | 2/2021 | Nelson | G06N 5/048 |
| 10,949,814 B1* | 3/2021 | Nelson | G06N 5/048 |
| 10,977,490 B1* | 4/2021 | Bokshi-Drotar | G06V 20/10 |
| 2015/0242686 A1* | 8/2015 | Lenka | G06K 9/6202 382/103 |
| 2018/0260793 A1* | 9/2018 | Li | G06T 7/001 |
| 2018/0293552 A1* | 10/2018 | Zhang | G06K 9/3233 |
| 2018/0293664 A1* | 10/2018 | Zhang | G06T 7/0004 |
| 2018/0293806 A1 | 10/2018 | Zhang | |
| 2019/0073641 A1* | 3/2019 | Utke | G06T 7/0004 |
| 2020/0005478 A1* | 1/2020 | Zhong | G06T 7/001 |
| 2020/0034958 A1* | 1/2020 | Campbell | G06Q 10/10 |
| 2020/0074178 A1* | 3/2020 | Guo | G06N 7/005 |
| 2020/0090320 A1* | 3/2020 | Xu | G06K 9/627 |
| 2020/0110965 A1* | 4/2020 | Zhao | G06K 9/00664 |
| 2020/0111203 A1* | 4/2020 | Tan | G06K 9/6268 |
| 2020/0223385 A1* | 7/2020 | Brozovich | G07C 5/0808 |
| 2020/0250461 A1* | 8/2020 | Yang | G06K 9/4642 |
| 2020/0290608 A1* | 9/2020 | Liu | G06N 3/08 |
| 2020/0349353 A1* | 11/2020 | Guo | G06K 9/46 |
| 2020/0357196 A1* | 11/2020 | Zhang | G06K 9/627 |
| 2021/0150691 A1* | 5/2021 | Xu | G06N 3/08 |

FOREIGN PATENT DOCUMENTS

| | | |
|---|---|---|
| CN | 108229497 A | 6/2018 |
| CN | 108446618 A | 8/2018 |

OTHER PUBLICATIONS

Redmon, J. et al., "You Only Look Once: Unified, Real-Time Object Detection," published May 9, 2016, pp. 1-10.

Patil, K. et al., "Deep Learning Based Car Damage Classification," 2017 16th IEEE International Conference on Machine Learning and Applications, pp. 50-54.

Li, P. et al, "An Anti-Fraud System for Car Insurance Claim Based on Visual Evidence," published Apr. 30, 2018, pp. 1-6.

* cited by examiner

METHOD AND APPARATUS FOR GENERATING VEHICLE DAMAGE INFORMATION

CROSS-REFERENCE TO RELATED APPLICATIONS

This application claims priority to Chinese Patent Application No. 201811169076.1, filed on Oct. 8, 2018, titled "Method and Apparatus for Generating Vehicle Damage Information," which is hereby incorporated by reference in its entirety.

TECHNICAL FIELD

Embodiments of the present disclosure relate to the field of computer technology, specifically to a method and apparatus for generating vehicle damage information.

BACKGROUND

Generally, after a vehicle traffic accident, the insurance company needs to perform a vehicle damage assessment on the accident vehicle and file accident data. Vehicle damage assessment includes a scientific and systematic damage estimation and pricing for vehicle collision repair, using vehicle damage estimation data and maintenance data, and comprehensively analyzing a vehicle collision and accident scene based on automobile construction principles through scientific and systematic professional examination, testing and survey means.

At present, generally, the vehicle damage assessment is performed manually using a way that the insurance company staff arrives at a traffic accident scene to perform investigation.

SUMMARY

Embodiments of the present disclosure propose a method and apparatus for generating vehicle damage information.

In a first aspect, some embodiments of the present disclosure provide a method for generating vehicle damage information, including: acquiring a to-be-processed vehicle image; for a target detection model in at least one pre-trained target detection model: inputting the vehicle image to the target detection model to generate a suspected damage area detection result; and determining a location of a suspected damage area in the vehicle image based on the generated suspected damage area detection result.

In some embodiments, the target detection model in the at least one target detection model is configured to detect suspected damage areas of different damage types.

In some embodiments, the target detection model in the at least one target detection model is obtained by training as: acquiring a training sample set, where a training sample includes a sample image, and a suspected damage area labeling result corresponding to the sample image and having the damage type detected by configuring the target detection model; and using sample images of training samples in the training sample set as input, and using labeling results corresponding to the input sample images as output, to perform training to obtain the target detection model.

In some embodiments, the suspected damage area detection result includes a confidence that a pixel in the vehicle image belongs to the suspected damage area; and the determining a location of a suspected damage area in the vehicle image based on the generated suspected damage area detection result, includes: determining, in generated confidence, a pixel corresponding to a confidence greater than a preset confidence threshold as a pixel belonging to the suspected damage area; and determining the location of the suspected damage area in the vehicle image based on a location of the determined pixel.

In some embodiments, the method further includes: determining the damage type detected by configuring the target detection model that generates the confidence greater than the confidence threshold as a damage type of the suspected damage area in the vehicle image.

In some embodiments, the target detection model in the at least one target detection model includes a feature extraction network having a pyramid structure.

In a second aspect, some embodiments of the present disclosure provide an apparatus for generating vehicle damage information, including: an acquisition unit, configured to acquire a to-be-processed vehicle image; a generation unit, configured to: for a target detection model in at least one pre-trained target detection model: input the vehicle image to the target detection model to generate a suspected damage area detection result; and a first determining unit, configured to determine a location of a suspected damage area in the vehicle image based on the generated suspected damage area detection result.

In some embodiments, the target detection model in the at least one target detection model is configured to detect suspected damage areas of different damage types.

In some embodiments, the target detection model in the at least one target detection model is obtained by training as: acquiring a training sample set, where a training sample includes a sample image, and a suspected damage area labeling result corresponding to the sample image and having the damage type detected by configuring the target detection model; and using sample images of training samples in the training sample set as input, and using labeling results corresponding to the input sample images as output, to perform training to obtain the target detection model.

In some embodiments, the suspected damage area detection result includes a confidence that a pixel in the vehicle image belongs to the suspected damage area; and the first determining unit includes: a first determining subunit, configured to determine, in generated confidence, a pixel corresponding to a confidence greater than a preset confidence threshold as a pixel belonging to the suspected damage area; and a second determining subunit, configured to determine the location of the suspected damage area in the vehicle image based on a location of the determined pixel.

In some embodiments, the apparatus further includes: a second determining unit, configured to determine the damage type detected by configuring the target detection model that generates the confidence greater than the confidence threshold as a damage type of the suspected damage area in the vehicle image.

In some embodiments, the target detection model in the at least one target detection model includes a feature extraction network having a pyramid structure.

In a third aspect, some embodiments of the present disclosure provide a device, including: one or more processors; and a storage apparatus, storing one or more programs thereon, where the one or more programs, when executed by the one or more processors, cause the one or more processors to implement the method in the first aspect.

In a fourth aspect, some embodiments of the present disclosure provide a computer readable medium, storing a computer program thereon, the program, when executed by a processor, implements the method in the first aspect.

According to the method and apparatus for generating vehicle damage information provided by the embodiments of the present disclosure, by acquiring a to-be-processed vehicle image, then for a target detection model in at least one pre-trained target detection model: inputting the vehicle image to the target detection model to generate a suspected damage area detection result, and finally determining a location of a suspected damage area in the vehicle image based on the generated suspected damage area detection result, a mechanism for detecting a suspected damage area based on the target detection model is provided, improving the vehicle damage assessment efficiency.

BRIEF DESCRIPTION OF THE DRAWINGS

After reading detailed descriptions of non-limiting embodiments with reference to the following accompanying drawings, other features, objectives and advantages of the embodiments of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
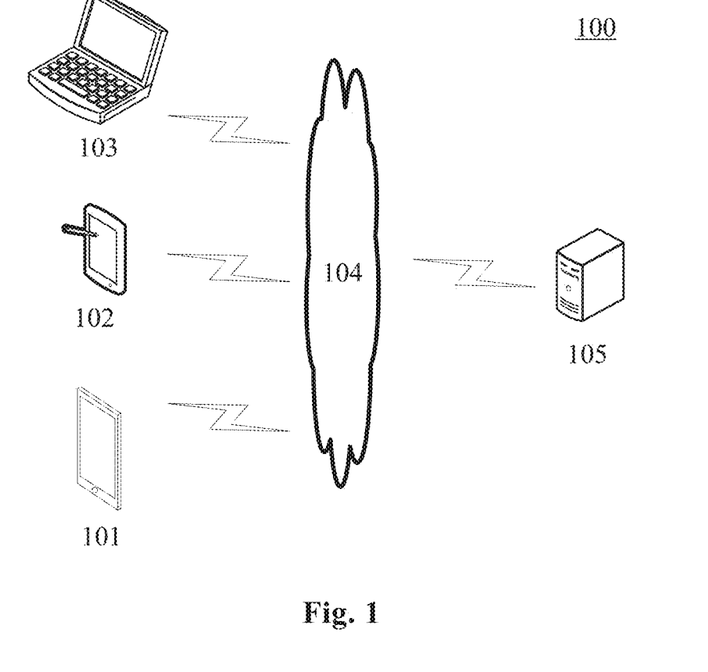
FIG. 1 is an example system architecture diagram to which some embodiments of the present disclosure may be applied.

FIG. 1 illustrates an example system architecture 100 of a method for generating vehicle damage information or an apparatus for generating vehicle damage information to which the embodiments of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal devices 101, 102, 103 to receive or transmit messages and the like. Various communication client applications, such as image acquisition applications, image processing applications, vehicle insurance applications, or search applications, may be installed on the terminal devices 101, 102, and 103.

The terminal devices 101, 102, 103 may be hardware or software. When being hardware, the terminal devices 101, 102, 103 are may be various electronic devices having display screens, including but not limited to smart phones, tablets, laptop portable computers, desktop computers, and the like. When being software, the terminal devices 101, 102, 103 may be installed in the above-listed electronic devices. The terminal devices 101, 102, 103 may be implemented as a plurality of software or software modules (for example, for providing image acquisition services or liveness detection services) or as a single software or software module, which is not specifically limited herein.

The server 105 may be a server that provides various services, such as a background server that provides support for the applications installed in the terminal devices 101, 102, 103. The server 105 may acquire a to-be-processed vehicle image; for a target detection model in at least one pre-trained target detection model: input the vehicle image to the target detection model to generate a suspected damage area detection result; and determine a location of a suspected damage area in the vehicle image based on the generated suspected damage area detection result It should be noted that the method for generating vehicle damage information provided by the embodiments of the present disclosure may be performed by the server 105, or may be performed by the terminal devices 101, 102, 103. Accordingly, the apparatus for generating vehicle damage information may be disposed in the server 105, or may be disposed in the terminal devices 101, 102, 103.

It should be noted that the server may be hardware or software. When being hardware, the server may be implemented as a distributed server cluster composed of multiple servers, or may be implemented as a single server. When being software, the server may be implemented as a plurality of software or software modules (for example, for providing distributed services), or as a single software or software module, which is not specifically limited herein.

It should be understood that the number of terminal devices, networks, and servers in FIG. 1 is merely illustrative. Depending on the implementation needs, there may be any number of terminal devices, networks, and servers.

Figure 2:
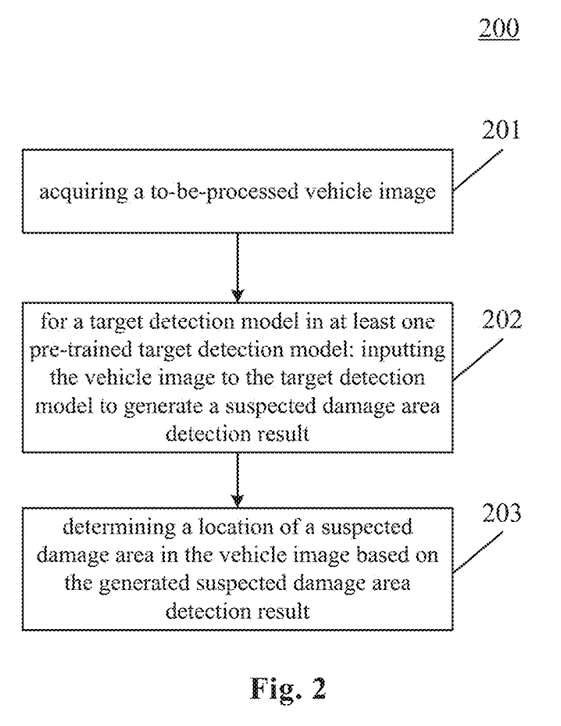
FIG. 2 is a flowchart of a method for generating vehicle damage information according to some embodiments of the present disclosure.

With further reference to FIG. 2, a flow 200 of a method for generating vehicle damage information according to some embodiments of the present disclosure is illustrated. The method for generating vehicle damage information includes the following steps 201 to 203.

Step 201, acquiring a to-be-processed vehicle image.

In the present embodiment, an executing body of the method for generating vehicle damage information (for example, the server or terminal shown in FIG. 1) may first acquire the to-be-processed vehicle image. The executing body may acquire the vehicle image using a plurality of ways, for example, acquiring the to-be-processed vehicle image voluntarily uploaded by a user or an insurance company through the client, or acquiring the to-be-processed vehicle image by connecting to a specific data storage server (such as the server of the insurance company). The to-be-processed vehicle image may be a captured original image, or an image obtained by performing an operation such as preprocessing or classification on the image.

As an example, the preprocessing may include enlarging or shrinking the image, cropping the image, rotating the image, subtracting the RGB value of a pixel point in the image by a preset RGB mean value, graying the image, or performing a homography transformation on the image through a predetermined feature point, or the like.

Here, the rule for classification may be set according to actual needs. For example, for a vehicle appearance damage assessment service, irrelevant picture type may include: photos of components inside the vehicle, photos of the interior of the vehicle, photos of the accident scene environment, or the like, and only an image whose image category is vehicle appearance may be determined as the to-be-processed vehicle image.

Step 202, for a target detection model in at least one pre-trained target detection model: inputting the vehicle image to the target detection model to generate a suspected damage area detection result.

In the present embodiment, for the target detection model in the at least one pre-trained target detection model, the executing body may input the vehicle image acquired in step 201 to the target detection model to generate the suspected damage area detection result. The target detection model may be configured to detect location information of a suspected damage area in the image. The detection result may include the location information of the suspected damage area, a probability that each pixel in the image is included in the suspected damage area, and a confidence that a certain area in the image is the suspected damage area.

Alternatively, the target detection model may be a corresponding relationship table storing the plurality of sample images and the location information of the suspected damage areas in the sample images, obtained by performing statistical analysis on a large number of sample images and location information of suspected damage areas in the sample images by those skilled in the art. In this case, the executing body may calculate the similarity between the vehicle image and each sample image in the corresponding relationship table, and obtain the suspected damage area detection result corresponding to the vehicle image from the corresponding relationship table based on a similarity calculation result. For example, first, a sample image having the highest similarity with the vehicle image is determined, and then the location information of the suspected damage area in the sample image is found from the corresponding relationship table as the suspected damage area detection result corresponding to the vehicle image.

In some alternative implementations of the present embodiment, the target detection model may be obtained by supervised training of an existing machine learning model using machine learning methods and training samples. For example, a model such as a region-sensitive convolutional neural network model (Regions with CNN, RCNN) or a full convolutional network model may be used. Compared with a conventional convolutional neural network model, the full convolutional network model eliminates the fully connected layer in the network structure, greatly reduces the parameters of the model, and transforms the image segmentation into a pixel-wise prediction problem by upsampling, saving computation time compared to the conventional patch-wise approach.

In some alternative implementations of the present embodiment, the target detection model in the at least one target detection model includes a feature extraction network having a pyramid structure. The feature extraction network having a pyramid structure may be a feature pyramid network (FPN) or other feature extraction network that fuses the output of different depth feature extraction layers (such as the convolution layer), and the feature pyramid may be used to detect objects of different scales and improve the accuracy of model output.

In some alternative implementations of the present embodiment, the target detection model in the at least one target detection model is obtained by training as: acquiring a training sample set, where a training sample includes a sample image and a suspected damage area labeling result corresponding to the sample image and having the damage type detected by configuring the target detection model; and using sample images of training samples in the training sample set as input, and using labeling results corresponding to the input sample images as output, to perform training to obtain the target detection model. Alternatively, the training sample set may include multi-scale training samples to improve the detection accuracy of the model for targets of different sizes.

In some implementations, the using sample images of training samples in the training sample set as input, and using labeling results corresponding to the input sample images as output to perform training to obtain the target detection model may include the following three steps.

First step includes acquiring a training sample in the training sample set, and inputting a sample image corresponding to the training sample to the target detection model, to obtain a detection result corresponding to the training sample.

As an example, for an untrained multi-layer convolutional neural network, its various network parameters (e.g., weight value parameters and offset parameters) are initialized with a different small random numbers. The "small random numbers" are used to ensure that the network does not enter saturation due to excessive weight value, which leads to training failure. "Different" is used to ensure that the network can learn normally. For a multi-layer convolutional neural network whose training is not finished, its various network parameters may be adjusted network parameters, but the recognition effect of the multi-layer convolutional neural network does not satisfy a preset constraint condition.

Second step includes determining a difference between the detection result of the sample image corresponding to the training sample and an image type labeling result of the sample image corresponding to the training sample.

Here, the electronic device may use various loss functions to determine the difference, and the method for determining the difference using the loss functions is a well-known technique widely studied and applied at present, and detailed description thereof will be omitted.

Third step includes adjusting parameters of the target detection model based on the determined difference.

Here, the parameters of the target detection model may be adjusted based on the difference using various implementations. For example, the BP (Back Propagation) algorithm or the SGD (Stochastic Gradient Descent) algorithm may be used to adjust the parameters of the target detection model. In practice, after each training sample in the training sample set performs the above training steps or the recognition effect of the target detection model satisfies the preset constraint condition, the training of the target detection model is completed.

In some alternative implementations of the present embodiment, the target detection model in the at least one target detection model is configured to detect suspected damage areas of different damage types, and the damage types detected may be set according to actual needs.

For example, classified according to the damage type, the at least one target detection model may include: a target detection model for detecting a suspected damage area of scratch, a target detection model for detecting a suspected damage area of depression, and a target detection model for detecting a suspected damage area of hole and so on; classified according to the damage material, the at least one target detection model may include: a target detection model for detecting a suspected damage area of vehicle paint, a target detection model for detecting a suspected damage area of metal, and a target detection model for detecting a suspected damage area of plastic and so on; and classified according to the damaged component, the at least one target detection model may include: a target detection model for detecting a suspected damage area of vehicle door, a target detection model for detecting a suspected damage area of bumper, and a target detection model for detecting a suspected damage area of vehicle light and so on. In addition, the at least one target detection model may be classified according to the vehicle type and other elements, and detailed description thereof will be omitted.

In the training phase of the target detection model, a training sample matching the damage type detected by configuring the model is used. For example, when training the target detection model for detecting a suspected damage area of scratch, a sample image of the damage area labelled with the type of scratch may be used.

The target detection model is established for suspected damage areas of different damage types, which can simultaneously adapt to the suspected damage areas of different vehicle types, damage types, locations and materials to achieve good detection accuracy.

Step 203, determining a location of a suspected damage area in the vehicle image based on the generated suspected damage area detection result.

In the present embodiment, the executing body may determine the location of the suspected damage area in the vehicle image based on the generated suspected damage area detection result in step 202. The detection result may include the location information of the suspected damage area, a confidence that each pixel in the image is included in the suspected damage area, a confidence that a certain area in the image is the suspected damage area, or the like. Accordingly, the determination of the location of the suspected damage area in the vehicle image based on the generated suspected damage area detection result is also different. For example, when the detection result includes the location information of the suspected damage area, the location information of the suspected damage area may be acquired directly from the detection result. When the detection result includes the confidence that a certain area in the image is the suspected damage area, whether the confidence is greater than a preset confidence threshold may be determined to determine if the area belongs to the suspected damage area, thereby determining the location of the suspected damage area in the vehicle image.

Figure 3:
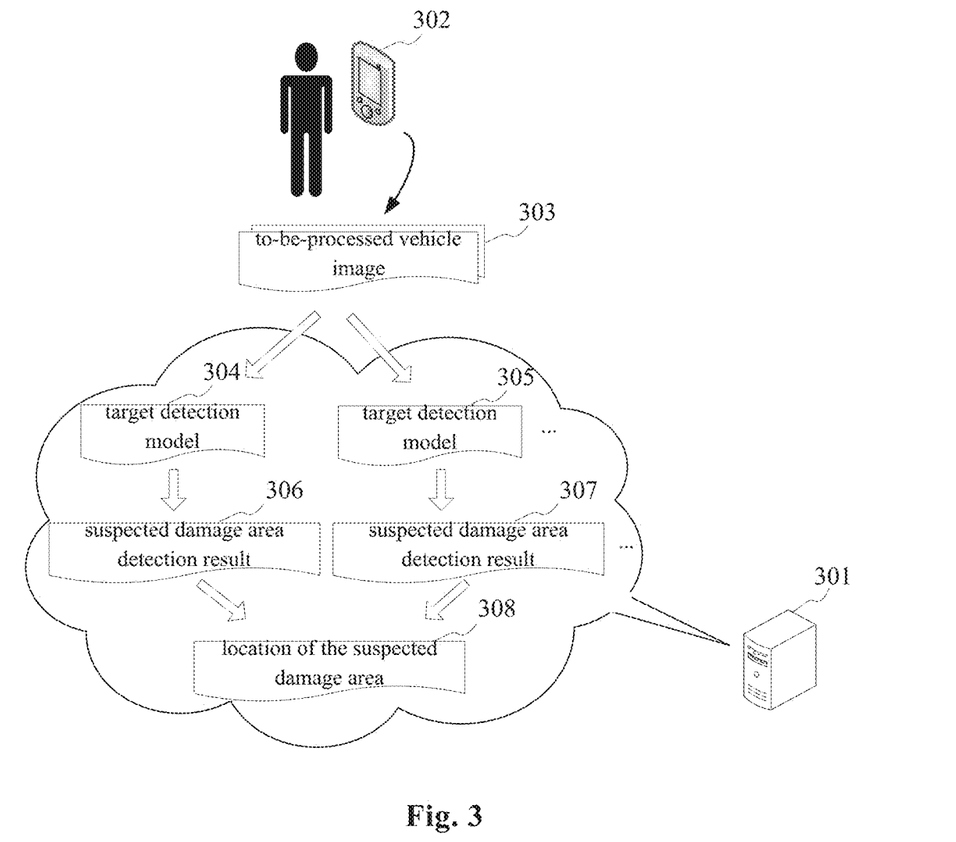
FIG. 3 is a schematic diagram of an application scenario of the method for generating vehicle damage information according to some embodiments of the present disclosure.

With further reference to FIG. 3, FIG. 3 is a schematic diagram of an application scenario of the method for generating vehicle damage information according to the present embodiment. In the application scenario of FIG. 3, a server 301 first acquires a to-be-processed vehicle image 303 uploaded by a user through a terminal 302; for a target detection model 304 and a target detection model 305 in the at least one pre-trained target detection model: inputs the vehicle image 303 to the target detection model 304 to generate a suspected damage area detection result 306; inputs the vehicle image 303 to the target detection model 305 to generate a suspected damage area detection result 307; and determine a location 308 of the suspected damage area in the vehicle image 303 based on the generated suspected damage area detection result 306 and the suspected damage area detection result 307.

According to the method provided by the above embodiment of the present disclosure, by acquiring a to-be-processed vehicle image, for a target detection model in at least one pre-trained target detection model: inputting the vehicle image to the target detection model to generate a suspected damage area detection result, and determining a location of a suspected damage area in the vehicle image based on the generated suspected damage area detection result, a mechanism for detecting a suspected damage area based on the target detection model is provided, improving the vehicle damage assessment efficiency.

Figure 4:
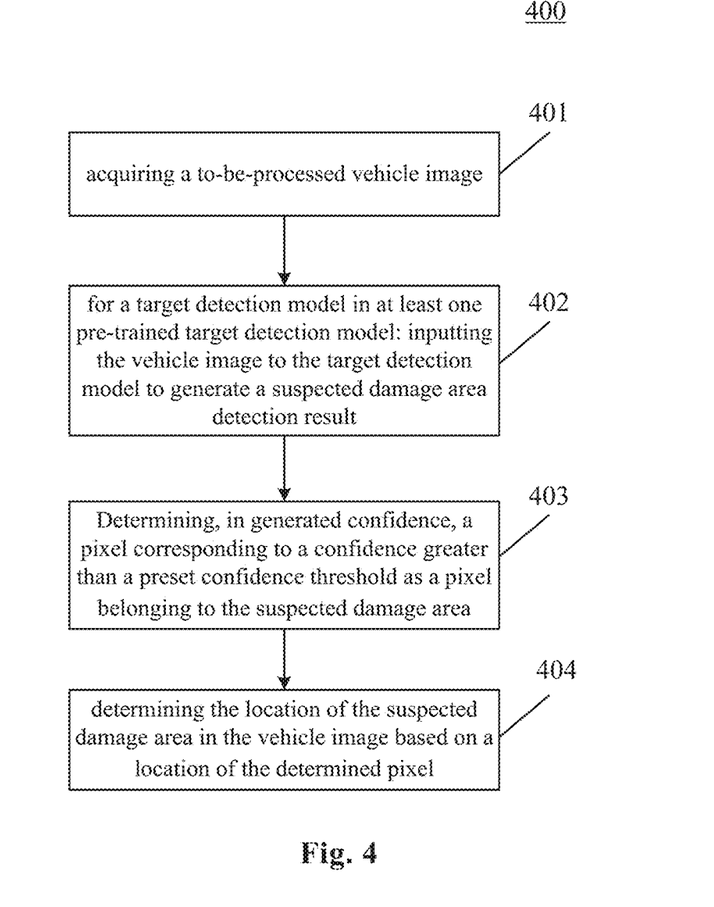
FIG. 4 is a flowchart of the method for generating vehicle damage information according to other embodiments of the present disclosure.

With further reference to FIG. 4, a flow 400 of another embodiment of the method for generating vehicle damage information is illustrated. The flow 400 of the method for generating vehicle damage information includes the following steps 401 to 404.

Step 401, acquiring a to-be-processed vehicle image.

In the present embodiment, an executing body of the method for generating vehicle damage information (for example, the server or terminal shown in FIG. 1) may first acquire the to-be-processed vehicle image.

Step 402, for a target detection model in at least one pre-trained target detection model: inputting the vehicle image to the target detection model to generate a suspected damage area detection result.

In the present embodiment, for the target detection model in the at least one pre-trained target detection model, the executing body may input the vehicle image acquired in step 401 to the target detection model to generate the suspected damage area detection result.

Step 403, determining, in generated confidence, a pixel corresponding to a confidence greater than a preset confidence threshold as a pixel belonging to the suspected damage area.

In the present embodiment, the suspected damage area detection result includes a confidence that a pixel in the vehicle image belongs to the suspected damage area. The executing body may determine, in the confidence generated in step 402, the pixel corresponding to the confidence greater than the preset confidence threshold as the pixel belonging to the suspected damage area. The confidence threshold may be set according to actual needs.

Step 404, determining the location of the suspected damage area in the vehicle image based on a location of the determined pixel.

In the present embodiment, the executing body may determine the location of the suspected damage area in the vehicle image based on the location of the pixel determined in step 403. In addition, the CRF (conditional random field algorithm) and an image enhancement method may be used to further optimize the determined location of the suspected damage area in the vehicle image.

In some alternative implementations of the present embodiment, the method further includes: determining a damage type that a target detection model generating the confidence greater than the confidence threshold is configured to detect as a damage type of the suspected damage area in the vehicle image. For example, the image is input to a first target detection model for detecting a suspected damage area of scratch, and a second target detection model for detecting a suspected damage area of depression, the confidence of some pixels belonging to the suspected damage area in the image output by the first target detection model is greater than the confidence threshold, and no pixel belonging to the suspected damage area in the image output by the second target detection model and having confidence greater than the confidence threshold is detected. The damage type of the suspected damage area detected by the first target detection model is scratch.

In addition, maintenance information of the vehicle, such as maintenance man-hours and maintenance costs, may be further determined according to the determined damage type of the suspected damage area, the location of the suspected damage area, and the like.

In the present embodiment, the operations of step 401 and step 402 are basically the same as the operations of step 201 and step 202, and detailed description thereof will be omitted.

As can be seen from FIG. 4, compared with the embodiment corresponding to FIG. 2, the suspected damage area detection result in the flow 400 of the method for generating vehicle damage information in the present embodiment includes the confidence that the pixel in the vehicle image belongs to the suspected damage area. The location of the suspected damage area is determined according to the confidence, further enriching the method for generating vehicle damage information.

Figure 5:
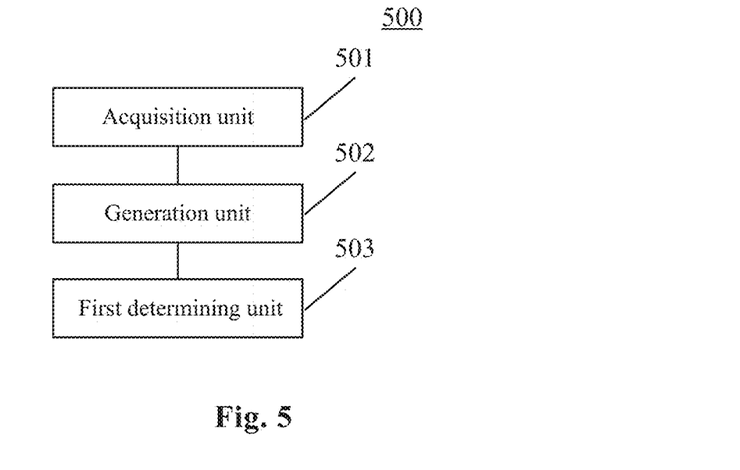
FIG. 5 is a schematic structural diagram of an apparatus for generating vehicle damage information according to some embodiments of the present disclosure.

With further reference to FIG. 5, as an implementation of the method shown in the above figures, the present disclosure provides an embodiment of an apparatus for generating vehicle damage information, and the apparatus embodiment corresponds to the method embodiment as shown in FIG. 2, and the apparatus may be specifically applied to various electronic devices.

As shown in FIG. 5, the apparatus 500 for generating vehicle damage information of the present embodiment includes: an acquisition unit 501, a generation unit 502 and a first determining unit 503. The acquisition unit is configured to acquire a to-be-processed vehicle image. The generation unit is configured to: for a target detection model in at least one pre-trained target detection model: input the vehicle image to the target detection model to generate a suspected damage area detection result. The first determining unit is configured to determine a location of a suspected damage area in the vehicle image based on the generated suspected damage area detection result.

In the present embodiment, the specific processing of the acquisition unit 501, the generation unit 502 and the first determining unit 503 of the apparatus 500 for generating vehicle damage information may refer to step 201, step 202, and step 203 in the embodiment corresponding to FIG. 2.

In some alternative implementations of the present embodiment, the target detection model in the at least one target detection model is configured to detect suspected damage areas of different damage types.

In some alternative implementations of the present embodiment, the target detection model in the at least one target detection model is obtained by training as: acquiring a training sample set, where a training sample includes a sample image, and a suspected damage area labeling result corresponding to the sample image and having a damage type detected by configuring the target detection model; and using sample images of training samples in the training sample set as input, and using labeling results corresponding to the input sample images as output, to perform training to obtain the target detection model.

In some alternative implementations of the present embodiment, the suspected damage area detection result includes a confidence that a pixel in the vehicle image belongs to the suspected damage area; and the first determining unit includes: a first determining subunit, configured to determine, in generated confidence, a pixel corresponding to a confidence greater than a preset confidence threshold as a pixel belonging to the suspected damage area; and a second determining subunit, configured to determine the location of the suspected damage area in the vehicle image based on a location of the determined pixel.

In some alternative implementations of the present embodiment, the apparatus further includes: a second determining unit, configured to determine the damage type that a target detection model generating the confidence greater than the confidence threshold is configured to detect as a damage type of the suspected damage area in the vehicle image.

In some alternative implementations of the present embodiment, the target detection model in the at least one target detection model includes a feature extraction network having a pyramid structure.

According to the apparatus provided by the above embodiment of the present disclosure, by acquiring a to-be-processed vehicle image, for a target detection model in at least one pre-trained target detection model: inputting the vehicle image to the target detection model to generate a suspected damage area detection result, and determining a location of a suspected damage area in the vehicle image based on the generated suspected damage area detection result, a mechanism for detecting a suspected damage area based on the target detection model is provided, improving the vehicle damage assessment efficiency.

Figure 6:
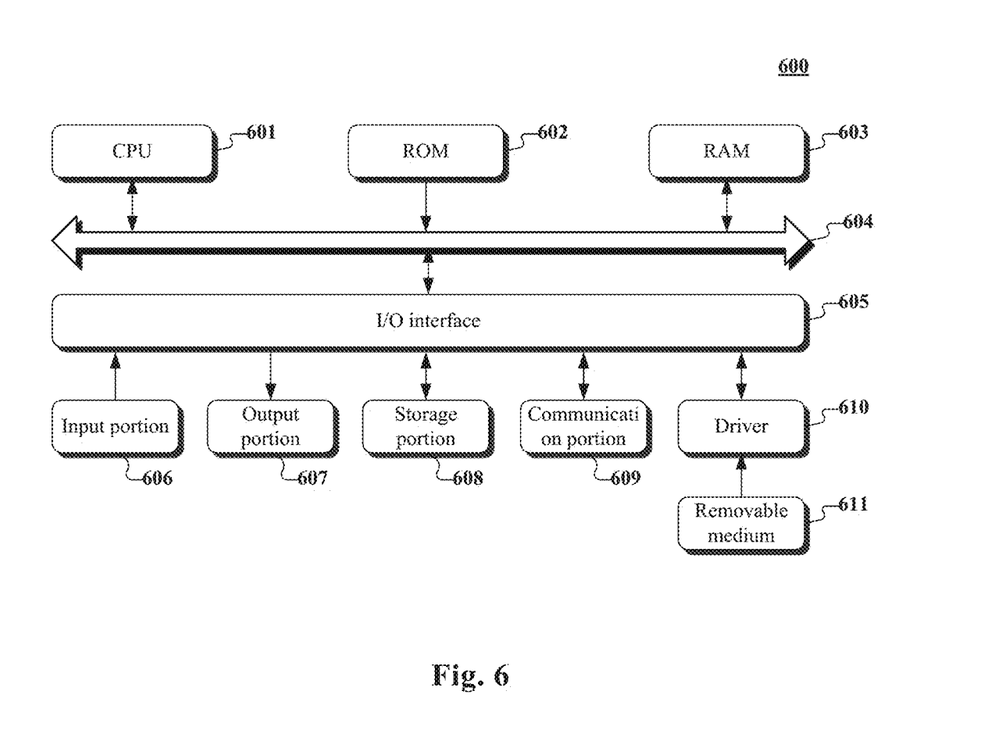
FIG. 6 is a schematic structural diagram of a computer system adapted to implement a server or a terminal of some embodiments of the present disclosure.

With further reference to FIG. 6, a schematic structural diagram of a computer system 600 adapted to implement a server or a terminal of the embodiments of the present disclosure is shown. The server or terminal shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components may be connected to the I/O interface 605: an input portion 606 including such as a keyboard, a mouse; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an acquisition unit, a generation unit and a first determining unit. Here, the names of these units do not in some cases constitute limitations to such units themselves. For example, the acquisition unit may also be described as "a unit configured to acquire a to-be-processed vehicle image".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire a to-be-processed vehicle image; for a target detection model in at least one pre-trained target detection model: input the vehicle image to the target detection model to generate a suspected damage area detection result; and determine a location of a suspected damage area in the vehicle image based on the generated suspected damage area detection result.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating vehicle damage information, the method comprising:

acquiring a to-be-processed vehicle image;

for a target detection model in at least one pre-trained target detection model: inputting the vehicle image to the target detection model to generate a suspected damage area detection result, wherein the detection result comprises a probability that each pixel in the vehicle image is included in a suspected damage area; and determining a location of the suspected damage area in the vehicle image based on the generated suspected damage area detection result, wherein the determining a location of a suspected damage area in the vehicle image based on the generated suspected damage area detection result, comprises:

determining a first confidence that a given pixel in the vehicle image is included in a first suspected damage area of a first type, and a second confidence that the given pixel in the vehicle image is included is a second suspected damage area of a second type different from the first type;

determining that the first confidence is greater than a preset confidence threshold, and the second confidence is smaller than the preset confidence threshold; and determining that the given pixel belongs to the first suspected damage area of the first type, in response to determining that the first confidence is greater than a preset confidence threshold, and the second confidence is smaller than the preset confidence threshold.

2. The method according to claim 1, wherein the target detection model in the at least one target detection model is configured to detect suspected damage areas of different damage types.

3. The method according to claim 2, wherein the target detection model in the at least one target detection model is obtained by training as:

acquiring a training sample set, wherein a training sample comprises a sample image, and a suspected damage area labeling result corresponding to the sample image and having the damage type detected by configuring the target detection model; and using sample images of training samples in the training sample set as input, and using labeling results corresponding to the input sample images as output, to perform training to obtain the target detection model.

4. The method according to claim 1, wherein the target detection model in the at least one target detection model comprises a feature extraction network having a pyramid structure.

5. An apparatus for generating vehicle damage information, the apparatus comprising:
    at least one processor; and
    a memory storing instructions, wherein the instructions when executed by the at least one processor, cause the at least one processor to perform operations, the operations comprising:
    acquiring a to-be-processed vehicle image;
    for a target detection model in at least one pre-trained target detection model: inputting the vehicle image to the target detection model to generate a suspected damage area detection result, wherein the detection result comprises a probability that each pixel in the vehicle image is included in a suspected damage area; and
    determining a location of the suspected damage area in the vehicle image based on the generated suspected damage area detection result, wherein the determining a location of a suspected damage area in the vehicle image based on the generated suspected damage area detection result, comprises:
    determining a first confidence that a given pixel in the vehicle image is included in a first suspected damage area of a first type, and a second confidence that the given pixel in the vehicle image is included is a second suspected damage area of a second type different from the first type;
    determining that the first confidence is greater than a preset confidence threshold, and the second confidence is smaller than the preset confidence threshold; and
    determining that the given pixel belongs to the first suspected damage area of the first type, in response to determining that the first confidence is greater than a preset confidence threshold, and the second confidence is smaller than the preset confidence threshold.

6. The apparatus according to claim 5, wherein the target detection model in the at least one target detection model is configured to detect suspected damage areas of different damage types.

7. The apparatus according to claim 6, wherein the target detection model in the at least one target detection model is obtained by training as:
    acquiring a training sample set, wherein a training sample comprises a sample image, and a suspected damage area labeling result corresponding to the sample image and having the damage type detected by configuring the target detection model; and
    using sample images of training samples in the training sample set as input, and using labeling results corresponding to the input sample images as output, to perform training to obtain the target detection model.

8. The apparatus according to claim 5, wherein the target detection model in the at least one target detection model comprises a feature extraction network having a pyramid structure.

9. A non-transitory computer readable medium, storing a computer program thereon, the program, when executed by a processor, causes the processor to perform operations, the operations comprising:
    acquiring a to-be-processed vehicle image;
    for a target detection model in at least one pre-trained target detection model: inputting the vehicle image to the target detection model to generate a suspected damage area detection result, wherein the detection result comprises a probability that each pixel in the vehicle image is included in a suspected damage area; and
    determining a location of the suspected damage area in the vehicle image based on the generated suspected damage area detection result, wherein the determining a location of a suspected damage area in the vehicle image based on the generated suspected damage area detection result, comprises:
    determining a first confidence that a given pixel in the vehicle image is included in a first suspected damage area of a first type, and a second confidence that the given pixel in the vehicle image is included is a second suspected damage area of a second type different from the first type;
    determining that the first confidence is greater than a preset confidence threshold, and the second confidence is smaller than the preset confidence threshold; and
    determining that the given pixel belongs to the first suspected damage area of the first type, in response to determining that the first confidence is greater than a preset confidence threshold, and the second confidence is smaller than the preset confidence threshold.

10. The method according to claim 1, wherein the target detection model comprises a corresponding relationship table storing a plurality of sample images and pieces of location information of a plurality of sample suspected damage areas in sample images, obtained by performing a statistical analysis on a large number of sample images and pieces of location information of suspected damage areas.

11. The method according to claim 2, wherein the suspected damage areas of different damage types are classified according to damage material.

12. The method according to claim 11, wherein the suspected damage areas of different damage types comprise at least one of a suspected damage area of metal, or a suspected damage area of plastic.

13. The method according to claim 11, wherein the suspected damage areas of different damage types comprise the suspected damage area of metal, and the suspected damage area of plastic.

* * * * *